(12) United States Patent
Wu et al.

(10) Patent No.: US 8,832,448 B2
(45) Date of Patent: Sep. 9, 2014

(54) DUAL-CHANNEL ELECTRONIC SIGNATURE SYSTEM USING IMAGE CODES AND RELATED COMPUTER PROGRAM PRODUCT

(71) Applicant: JRSYS International Corp., Taipei (TW)

(72) Inventors: Jiann-Dong Wu, Taipei (TW); Tai-Hung Lin, Taipei (TW); Jia-Hong Chen, Taipei (TW); Po-Yueh Hung, Changhua County (TW); Yan-Yi Shen, Taipei (TW); Tsung-Yu Chang, New Taipei (TW)

(73) Assignee: JRSYS International Corp., Taipei (TW)

( * ) Notice: Subject to any disclaimer, the term of this patent is extended or adjusted under 35 U.S.C. 154(b) by 1 day.

(21) Appl. No.: 13/728,206

(22) Filed: Dec. 27, 2012

(65) Prior Publication Data
US 2013/0166916 A1    Jun. 27, 2013

(30) Foreign Application Priority Data
Dec. 27, 2011 (TW) .............................. 100148877 A

(51) Int. Cl.
*H04L 29/06* (2006.01)
*G06F 21/00* (2013.01)
*H04L 9/32* (2006.01)

(52) U.S. Cl.
CPC .............. *H04L 9/3281* (2013.01); *H04L 9/321* (2013.01); *H04L 9/3247* (2013.01)
USPC .......................................... 713/176; 713/181

(58) Field of Classification Search
CPC ... H04L 9/3247; H04L 9/3244; H04L 9/3281; H04L 63/123; H04L 9/321; H04L 9/0866; H04L 63/12
See application file for complete search history.

(56) References Cited

U.S. PATENT DOCUMENTS
2012/0308003 A1* 12/2012 Mukherjee ..................... 380/243

FOREIGN PATENT DOCUMENTS
EP        0 950 992 A2    10/1999
TW          525072        3/2003

* cited by examiner

*Primary Examiner* — Izunna Okeke
(74) *Attorney, Agent, or Firm* — Birch, Stewart, Kolasch & Birch, LLP

(57) ABSTRACT

A dual-channel electronic signature system is disclosed, having a signature verification server, a signature requester device, and a hand-held device. The signature requester device calculates a characteristic value related to content of a target document, encodes the characteristic value and a destination message to generate a first graph, and outputs the first graph The hand-held device captures and decodes an image of the first graph to obtain the characteristic value, performs an electronic signature operation on the characteristic value to generate a signature data, encodes the signature data to generate a second graph, and transmits the second graph to a destination network address. If the signature data contained in the second graph passes a verification procedure of the signature verification server, the signature verification server transmits a verification graph corresponding to the second graph to the signature requester device.

15 Claims, 5 Drawing Sheets

DUAL-CHANNEL ELECTRONIC SIGNATURE SYSTEM USING IMAGE CODES AND RELATED COMPUTER PROGRAM PRODUCT

CROSS-REFERENCE TO RELATED APPLICATIONS

This application claims the benefit of priority to Patent Application No. 100148877, filed in Taiwan on Dec. 27, 2011; the entirety of which is incorporated herein by reference for all purposes.

BACKGROUND

The present disclosure generally relates to an electronic signature technology and, more particularly, to a dual-channel electronic signature system using image codes, and related computer program product.

In many environments, such as in business transactions, official document approval, applying for certificates, identity check, or public goods provision, papers are utilized for an entity (hereinafter, the signer) to sign names and used as the carrier of the signer's signature. This method not only wastes a lot of papers but also needs extra storage space to store the papers. It is apparently not an ideal solution from either the environmental protection perspective or the economy perspective.

Additionally, in the aforementioned occasions, the signer, such as a consumer, a person going to a bank or a government department for business, and a goods applicant, typically has to go to a specific place of a signature requester, such as a shop clerk, a bank teller, a government employee, or a goods delivery staff, to execute documents and deal with other related procedures. In this situation, the signer has a high trust on the identity reality of the signature requester, but the signature requester is hard to verify the identity reality of the signer. Hence, in many situations, the signature requester often demands the signer to provide related certification document to verify the identity of the signer. If the signer do not carry the identity certification document or the identity certification document is incomplete, the signer has to find the certification document and go back to complete the document execution procedure next time. This is very inconvenient for the signer.

Electronic signature technology may be adopted to verify the identity reality of the signer in order to omit the process of authenticating the identity certification document of the signer. However, it is difficult to verify the signature reality and ensure the security of data transmission while maintaining the operation convenience of the signature requester and the signer, which is always the bottleneck in designing the electronic signature mechanism.

SUMMARY

In view of the foregoing, it can be appreciated that a substantial need exists for an electronic signature mechanism that can verify the signature reality and ensure the security of data transmission while improving the convenience in use of the electronic signature.

An example embodiment of dual-channel electronic signature system is disclosed, comprising: a signature verification server; a signature requester device for calculating a characteristic value related to content of a target document, encoding the characteristic value and a destination message to generate a first graph, and outputting the first graph; and a hand-held device for capturing and decoding an image of the first graph to obtain the characteristic value, performing an electronic signature operation on the characteristic value to generate a signature data, encoding the signature data to generate a second graph, and transmitting the second graph to a destination network address; if the signature data contained in the second graph passes a verification procedure of the signature verification server, the signature verification server transmits a verification graph corresponding to the second graph to the signature requester device.

An example embodiment of a computer program product is disclosed. The computer program product is stored in a non-transitory computer readable medium, and enables a signature requester device to perform an electronic signature operation. The electronic signature operation comprises: calculating a characteristic value related to content of a target document; encoding the characteristic value and a destination message to generate a first graph; and outputting the first graph using an output device of the signature requester device.

Another example embodiment of a computer program product is disclosed. The computer program product is stored in a non-transitory computer readable medium and enables a hand-held device to perform an electronic signature operation. The electronic signature operation comprises: capturing an image of a first graph using an image capturing device of the hand-held device; decoding the first graph to obtain a characteristic value; performing an electronic signature operation on the characteristic value to generate a signature data; and utilizing a transmitter device of the hand-held device to transmit the signature data or a second graph generated by encoding the signature data to a destination network address.

The aforementioned dual-channel electronic signature system and related computer program product greatly facilitate the procedure of paperless document signing, and need not to waste physical storage space to store paper documents. Accordingly, both the purposes of environmental protection and economy can be satisfied at the same time.

DETAILED DESCRIPTION

Reference will now be made in detail to embodiments of the invention, which are illustrated in the accompanying drawings.

The same reference numbers may be used throughout the drawings to refer to the same or like parts or components/operations. Certain terms are used throughout the description and following claims to refer to particular components. As one skilled in the art will appreciate, a component may be referred by different names. This document does not intend to distinguish between components that differ in name but not in function. In the following description and in the claims, the term "comprise" is used in an open-ended fashion, and thus should be interpreted to mean "include, but not limited to...."

As used herein, the term "and/or" includes any and all combinations of one or more of the associated listed items. Additionally, the singular forms "a", "an", and "the" as used herein are intended to include the plural forms as well, unless the context clearly indicates otherwise.

Figure 1:
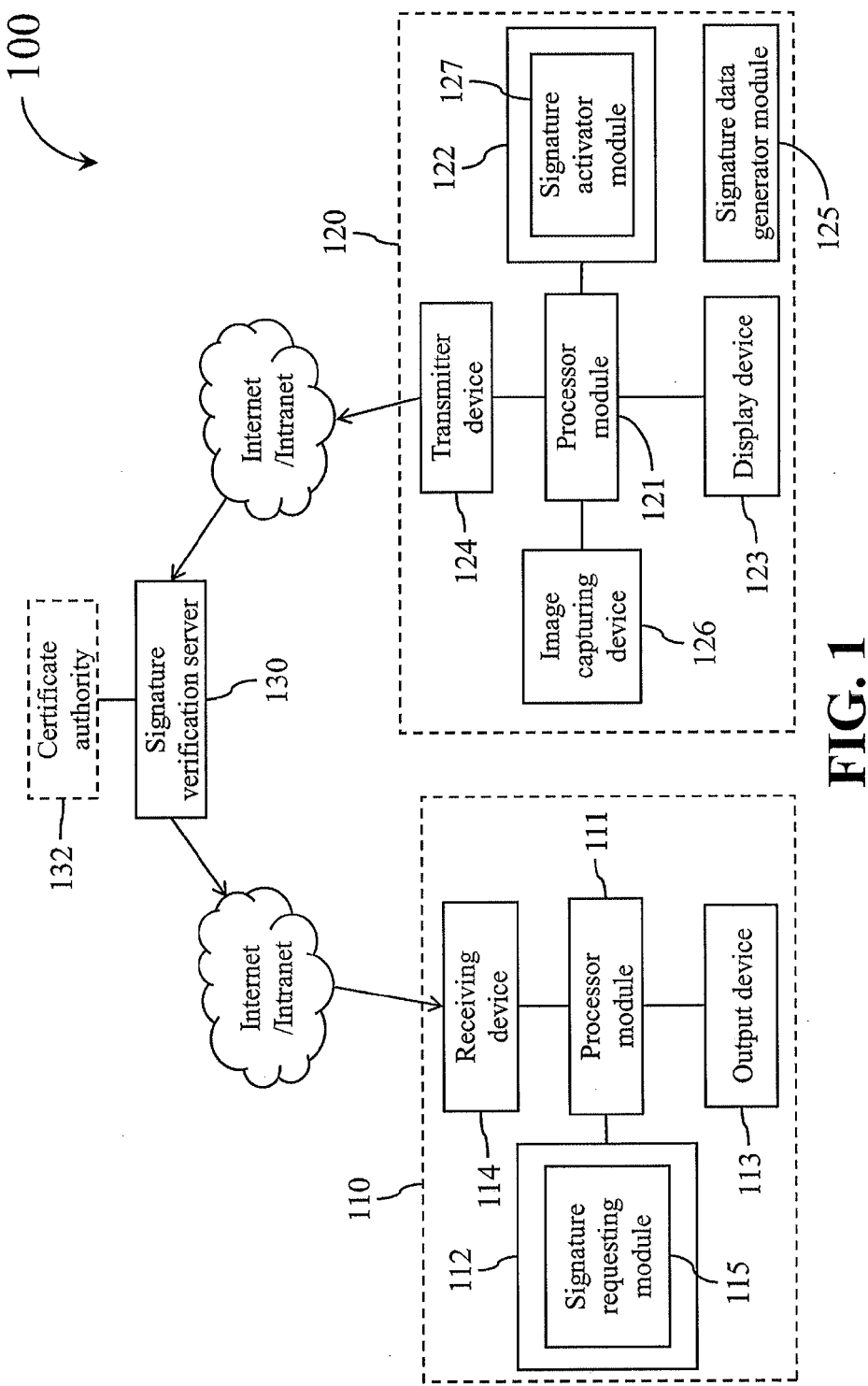
FIG. 1 shows a simplified functional block diagram of a dual-channel electronic signature system according to an embodiment of the present disclosure.

FIG. 1 shows a simplified functional block diagram of a dual-channel electronic signature system 100 according to an embodiment of the present disclosure. The dual-channel electronic signature system 100 comprises a signature requester device 110, a hand-held device 120, and a signature verification server 130. As shown in FIG. 1, the signature requester device 110 comprises a processor module 111, a storage device 112, an output device 113, a receiver device 114, and a signature requesting module 115 stored in the storage device 112. The hand-held device 120 comprises a processor module 121, a storage device 122, a display device 123, a transmitter device 124, a signature data generator module 125, an image capturing device 126, and a signature activator module 127 stored in the storage device 122.

In this embodiment, the signature requesting module 115 and the signature activator module 127 are functional modules realized with computer programs. The signature data generator module 125 is a hardware device or a software module dedicated to a valid user of the hand-held device 120. The signature data generator module 125 is utilized for performing an electronic signature operation to generate signature data under the control of the signature activator module 127. For example, the signature data generator module 125 may be a thin circuit board (also known as a card stick), which stores a signing key of the valid user of the hand-held device 120 and sticks on the SIM card of the hand-held device 120. Alternatively, the signature data generator module 125 may be a functional module realized with computer program and stored with the signing key of the valid user of the hand-held device 120.

In many environments, such as in business transactions, official document approval, applying for certificates, identity check, or public goods provision, people has to go to a specific place of a signature requester, such as a shop, a bank, government agencies, a place for goods delivery, and a manager office, to meet the signature requester to process the document verification and document signing in person. At this moment, the signature requester, such as a shop clerk, a bank teller, a government employee, a goods delivery staff, or a company subordinate, may utilize the signature requester device 110 to output a target document to be signature as well as a special graph coded by the signature requesting module 115 according to the related content of the target document to the signer for verifying. The term "signer" as used herein may be a person who has a right to execute an electronic signature on the target document, such as a consumer, a person going to a bank or a government department for business, a goods applicant, or a company manager. When the signer verifies that the content of the target document is correct, the signer may utilize the hand-held device 120 to capture an image of the special graph and to decode data to be signed form the image. The signature activator module 127 of the hand-held device 120 then utilizes the signature data generator module 125 to perform an electronic signature operation on the data to be signed and utilizes the transmitter device 124 to transmit the signed data to the signature verification server 130 for signature verification. Once completing the signature verification procedure, the signature verification server 130 transmits a related message to the signature requester device 110 so that the signature requester and the signer can verify the procedure.

In application, the signature requester device 110 may be any terminal device having calculation capability and capable of displaying or printing out graphs, controlling an external display to display graphs, or controlling an external printer to print out graphs. For example, the signature requester device 110 may be a desktop computer, a tablet computer, a notebook computer, a point of sale device, a cashier machine, etc. The hand-held 120 may be any mobile device having image capturing capability, such as a mobile phone, a notebook computer, a tablet computer, an E-book, or a handheld game console, etc. The operation of the dual-channel electronic signature system 100 will be further explained below with reference to FIGS. 2~4.

Figure 2:
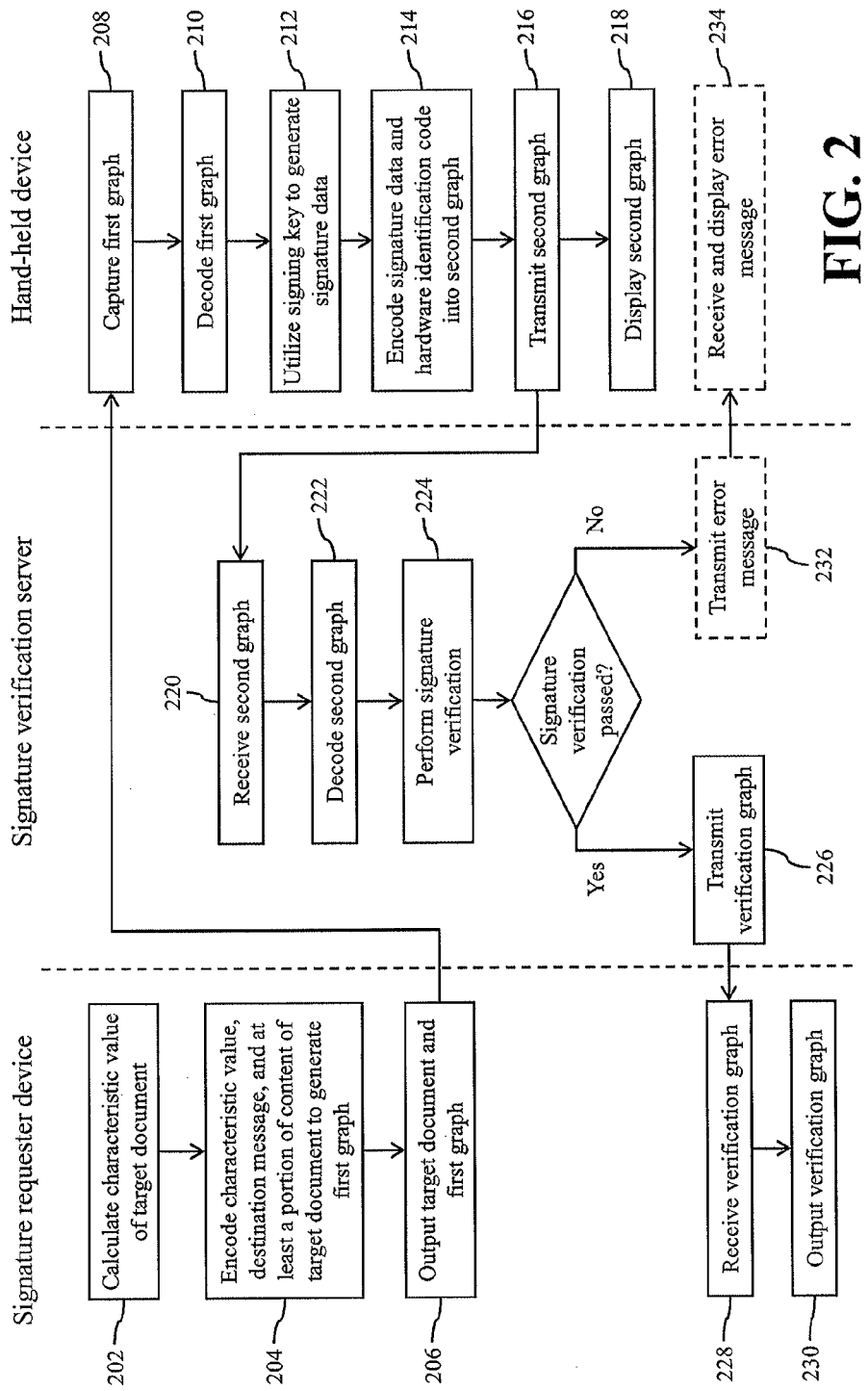
FIG. 2~4 show simplified flowcharts of an electronic signature method utilizing image code according to several embodiments of the present disclosure.

FIG. 2 shows a simplified flowchart of an electronic signature method utilizing an image code according to a first embodiment of the present disclosure. The left part of FIG. 2 represents the operations performed by the signature requester device 110 when the processor module 111 executes the signature requesting module 115 in the storage device 112. The right part of FIG. 2 represents the operations performed by the hand-held device 120 when the processor module 121 executes the signature activator module 127 in the storage device 122. The middle part of FIG. 2 represents the operations performed by the signature verification server 130. The same arrangement logic is also applicable to the following flowcharts in FIG. 3 and FIG. 4.

When the signature requester wants to provide a target document for the singer to perform electronic signature, the signature requester may utilize the processor module 111 of the signature requester device 110 to execute the signature requesting module 115 in the storage device 112 so as to perform the operations in the left part of FIG. 2.

In an operation 202, the signature requesting module 115 calculates a characteristic value of the target document according to at least a portion of the content of the target document. For example, the signature requesting module 115 may perform a hash algorithm on at least a portion of the content of the target document to generate a digest message as the characteristic value of the target document.

In an operation 204, the signature requesting module 115 performs a predetermined image encoding algorithm to encode the characteristic value, a predetermined destination message, and at least a portion of the content of the target document to generate a graph G1. For example, the signature requesting module 115 may utilize a QR code encoding algorithm to encode the aforementioned data into a two dimensional barcode, and utilizes the resulting two dimensional barcode to be the graph G2. In implementation, the destination message may be related to a network address, a device identification code, or identity of the user of the signature requester device 110.

For example, assuming that the operator of the signature requester device 110 (i.e., the signature requester in this case) is a teller having a teller number, 02, in an XYZ Bank, the aforementioned destination message may be "XYZ-bank.com/teller#=02" or a similar string, wherein "XYZ-bank.com" is a network address of the XYZ bank. For another example, if the signature requester device 110 is equipment having a machine ID, TT211, in an ABC Company, then the aforementioned destination message may be "ABC.com/e-signature/deviceid=#TT211" or a similar string, wherein "ABC.com" is a network address of the ABC Company.

In an operation 206, the signature requesting module 115 utilizes the output device 113 to output (such as display or print out) the target document and the graph G1 so that the target document and the graph G1 can be saw by the signer. In implementation, the output device 113 may be an output port of the signature requester device 110 for connecting with an external display or an external printer. Alternatively, the output device 113 may comprise a display or a printer, etc., of the signature requester device 110.

When the signer confirms that the content of the target document outputted from the output device 113 is correct, the signer may utilize the processor module 121 of the hand-held device 120 to execute the signature activator module 127 in the storage device 122 so as to perform the operations in the right part of FIG. 2.

In an operation 208, the signature activator module 127 utilizes the image capturing device 126 to capture an image of the graph G1 outputted from the output device 113. In implementation, the image capturing device 126 may comprise one or more sensors, such as CMOS (Complementary Metal Oxide Semiconductor) sensors, CCD (Charge Coupled Device) sensors, CMOS/CCD hybrid sensors, CID (Charge Injection Device) sensors, or other photographic sensors, for sensing the image of the graph G1 to generate a corresponding image signal.

In an operation 210, the signature activator module 127 utilizes a predetermined image decoding algorithm to decode the graph G1 so as to extract the characteristic value of the target document, the predetermined destination message and at least a portion of the content of the target document from the graph G1. For example, if the aforementioned signature requesting module 115 utilizes the QR code encoding algorithm to generate the graph G1, the signature activator module 127 may utilize a corresponding QR code decoding algorithm to decode the graph C1.

In an operation 212, the signature activator module 127 requests the signature data generator module 125 to utilize the signing key stored in the signature data generator module 125 to perform an electronic signature operation on the characteristic value so as to generate a signature data.

In an operation 214, the signature activator module 127 utilizes a predetermined image encoding algorithm to encode the signature data and a hardware identification code corresponding to the hand-held device 120 (or corresponding to the signature data generator module 125) to generate a graph G2. For example, the signature activator module 127 may utilize a QR code encoding algorithm to encode the signature data and the aforementioned hardware identification code into a two dimensional barcode, and utilizes the resulting two dimensional barcode to be the graph G2. In implementation, the aforementioned hardware identification code may be an identification code that can be utilized for identifying a device, such as a machine serial number of the hand-held device 120, a serial number of a SIM card, or a device serial number of the signature data generator module 125, etc.

In an operation 216, the signature activator module 127 decides a destination network address according to the destination message contained in the graph C1, and utilizes the transmitter device 124 to transmit the graph G2 to the destination network address through a first channel. In implementation, the aforementioned first channel may be a specific packet transmission path on Internet. In one embodiment, a predetermined string related to the network address of the signature verification server 130 is pre-stored in the signature data generator module 125 of the hand-held device 120, and the predetermined string is not allowed to be changed by the user of the hand-held device 120. The signature activator module 127 of this embodiment combines the destination message and the predetermined string stored in the signature data generator module 125 to generate a destination network address addressing to the signature verification server 130. For example, assuming that the destination message is a string "XYZ-bank.com/teller#=02" and the network address of the signature verification server 130's operator is "https://www.jrsys.com/", then the predetermined string stored in the signature data generator module 125 may be "https://www.jrsys.com/auth/" or other similar string. The signature activator module 127 in the operation 216 may combine the two strings, "XYZ-bank.com/teller#=02" and "https://www.jrsys.com/auth/," into a destination network address "https://www.jrsys.com/auth/XYZ-bank.com/teller#=02," and then transmit the graph G2 to the destination network address through the transmitter device 124.

As described above, the signature activator module 127 obtains the destination network address by combining the destination message contained in the graph G1 and the predetermined string stored in the signature data generator module 125. Hence, even if the signature requester device 110 is hacked so that a fake destination message is encoded into the graph G1, the signature activator module 127 does not transmit the generated graph G2 to any destination (such as a phishing website controlled by the hacker) other than the signature verification server 130. As a result, the transmission security of the signature data generated by the hand-held device 120 can be effectively ensured.

In an operation 218, the signature activator module 127 utilizes the display device 123 to display the graph G2.

Then, the signature verification server 130 performs an operation 220 to receive the graph G2 transmitted from the hand-held device 120.

In an operation 222, the signature verification server 130 utilizes a predetermined image decoding algorithm to decode the graph G2 so as to extract the signature data and the hardware identification code corresponding to the hand-held device 120 (or corresponding to the signature data generator module 125) from the graph G2. For example, if the aforementioned signature activator module 127 utilizes the QR code encoding algorithm to generate the graph G2, the signature verification server 130 may decode the graph G2 using a corresponding QR code decoding algorithm.

In an operation 224, the signature verification server 130 performs a signature verification operation to the signature data. For example, the signature verification server 130 may search database for a verifying key corresponding to the hardware identification code and then utilize the verifying key to perform the signature verification to the signature data. Alternatively, the signature verification server 130 may seek other certificate authority (CA) 132 for the verifying key corresponding to the hardware identification and then utilize a found key to perform the signature verification to the signature data.

If the signature data contained in the graph G2 passes the signature verification procedure of the signature verification server 130 successfully, the signature verification server 130 proceeds to an operation 226. Otherwise, the signature verification server 130 proceeds to an operation 232.

In the operation 226, the signature verification server 130 simply utilizes the graph G2 to be a verification graph G2' and transmits the verification graph G2' to the signature requester device 110 through a second channel. In this embodiment, the aforementioned second channel is the other specific packet transmission path on Internet. The signature verification server 130 may obtain information related to the network address of the signature requester device 110 according to a portion of the content of the destination network address utilized for transmitting the graph G2 from the handheld device 120 to the signature verification server 130. For example, in the aforementioned example, the destination network address utilized for transmitting the graph G2 from the hand-held device 120 to the signature verification server 130 is "https://www.jrsys.com/auth/XYZ-bank.com/teller#=02." Since the first half of the aforementioned network address "https://www.jrsys.com/auth/" is the predetermined string related to the network address of the signature verification server 130, the signature verification server 130 determines that the second half of the aforementioned network address "XYZ-bank.com/teller#=02" is related to the network address of the signature requester device 110.

In this embodiment, the signature verification server 130 also examines whether the second half of the aforementioned network address "XYZ-bank.com/teller#=02" belongs to a valid network segment pre-stored in the signature verification server 130. If the second half of the aforementioned network address "XYZ-bank.com/teller#=02" belongs to the valid network segment pre-stored in the signature verification server 130, the signature verification server 130 transmits the verification graph G2' to the signature requester device 110 through Internet. If the second half of the aforementioned network address "XYZ-bank.com/teller#=02" does not belong to the valid network segment pre-stored in the signature verification server 130, the signature verification server 130 determines that the second half of the aforementioned network address is fake. In this situation, the signature verification server 130 may return related notification message to the hand-held device 120.

As can be appreciated from the foregoing descriptions that if the signature requester device 110 is hacked and a fake destination message is thus encoded into the graph G1, it would result in that the second half of the destination network address utilized for transmitting the graph G2 from signature activator module 127 to the signature verification server 130 contains the fake destination message. Since the aforementioned fake destination message does not belong to the valid network segment prestored in the signature verification server 130, the signature verification server 130 does not transmit the verification graph G2' to the phishing website corresponding to the fake destination message. Accordingly, the aforementioned method of transmitting electronic signature effectively ensures the transmission security of the signature data generated by the hand-held device 120.

Then, the signature requesting module 115 of the signature requester device 110 performs an operation 228 to receive the verification graph G2' transmitted from the signature verification server 130 through the receiver device 114.

In an operation 230, the signature requesting module 115 utilizes the output device 113 of the signature requester device 110 to display or print out the verification graph G2' transmitted from the signature verification server 130 so that the verification graph G2' can be saw by the signer. At this moment, the signer and the signature requester may compare and verify the verification graph G2' outputted from the output device 113 and the graph G2 displayed on the display device 123 of the hand-held device 120. If the verification graph G2' outputted from the output device 113 matches with the graph G2 displayed on the display device 123, the signature requester may therefore confirm the identity reality of the signer, and the signer may acknowledge that the signature procedure regarding the target document is completed. Accordingly, the signer and the signature requester need not to check other identity certification documents.

In an operation 232, the signature verification server 130 transmits an error message indicating that the signature verification is failed to the hand-held device 120.

When the hand-held device 120 receives the error message, the display device 123 displays the error message to inform the signer.

As can be seen from the aforementioned descriptions, with the signature verification operation performed by the signature verification server 130, the signer is able to complete the electronic signature procedure by merely using the portable hand-held device 120, and needs not to provide other identity certification documents to the signature requester for verifying. This approach not only greatly simplifies the whole procedure of signing documents to increase the convenience for the signer, but also enables the signature requester to effectively verify the identity reality of the signer.

Figure 3:
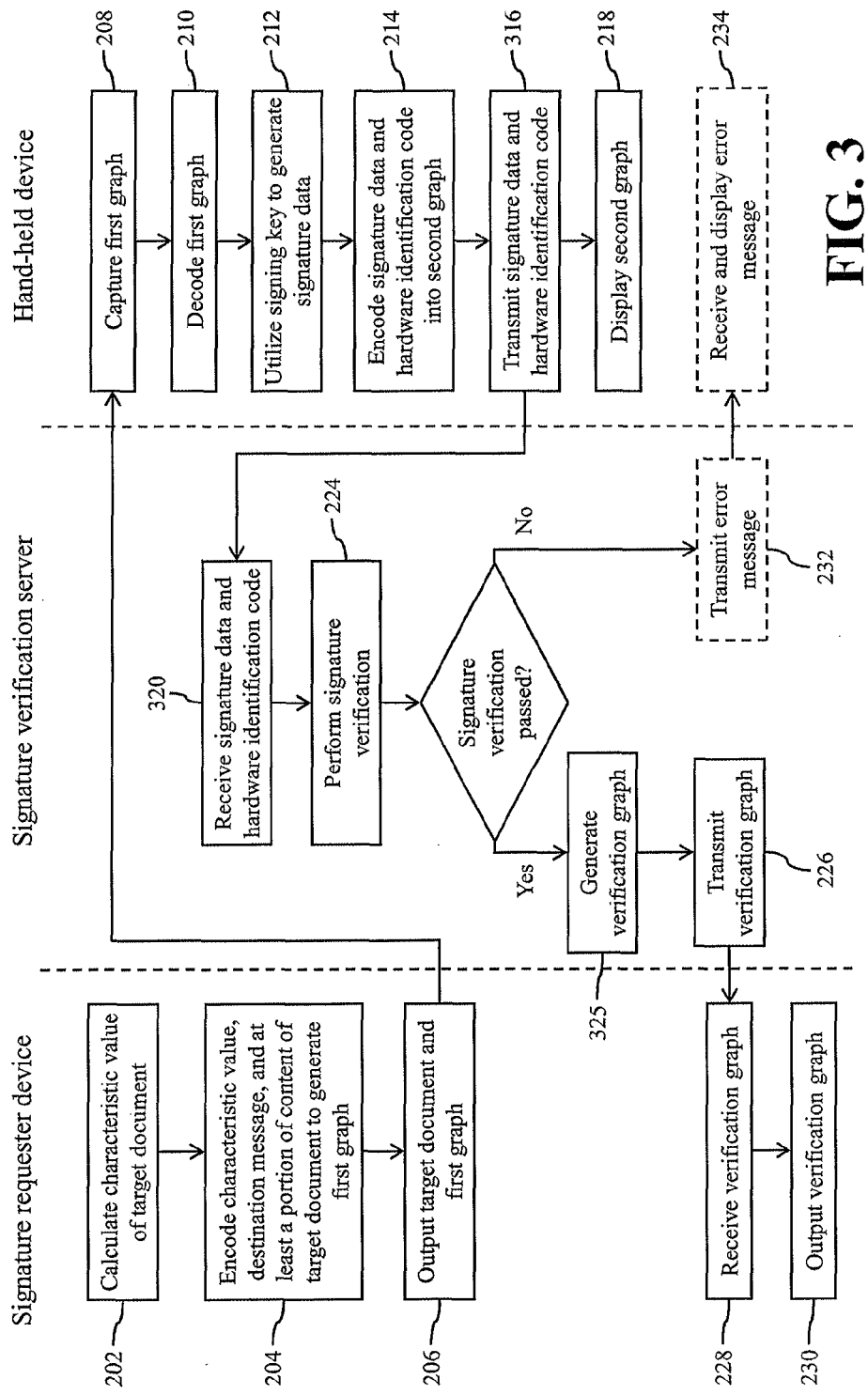

FIG. 3 shows a simplified flowchart of an electronic signature method utilizing an image code according to a second embodiment of the present disclosure. The method of FIG. 3 is similar to the method of FIG. 2. The differences between FIG. 2 and FIG. 3 are the operation 216 of FIG. 2 is replaced by an operation 316 in FIG. 3, the operations 220 and 222 of FIG. 2 are replaced by an operation 320 in FIG. 3, and a new operation 325 is added in the method of FIG. 3. The aforementioned description regarding other operations in FIG. 2 is also applicable to the embodiment of FIG. 3. For simplicity, the following description only illustrates the differences between FIG. 3 and FIG. 2.

In an operation 316 of FIG. 3, the signature activator module 127 decides a destination network address according to the destination message contained in the graph G1, and transmits the signature data generated in the operation 212 as well as a hardware identification code corresponding to the hand-held device 120 (or corresponding to the signature data generator module 125) to the destination network address through the transmitter device 124 and Internet.

Similar to the aforementioned method of FIG. 2, the signature activator module 127 obtains a destination network address by combining the destination message contained in the graph G1 and the predetermined string stored in the signature data generator module 125. Even if the signature requester device 110 is hacked so that a fake destination message is encoded into the graph 01, the signature activator module 127 does not transmit the resulting graph G2 to any destination (such as a phishing website controlled by the hacker) other than the signature verification server 130. As a result, the transmission security of the signature data generated by the hand-held device 120 can be effectively ensured.

Then, the signature verification server 130 performs an operation 320 to receive the signature data and the hardware identification code transmitted from the handheld device 120.

Then, the signature verification server 130 performs the aforementioned operation 224.

According to the method of FIG. 3, if the signature data transmitted from the hand-held device 120 passes the signature verification procedure of the signature verification server 130 successfully, the signature verification server 130 proceeds to the operation 325. Otherwise, the signature verification server 130 proceeds to the operation 232.

In an operation 325, the signature verification server 130 utilizes a predetermined image encoding algorithm to encode the signature data and a hardware identification code transmitted from the hand-held device 120 to generate the verification graph G2' which is the same as the graph G2. For example, the signature verification server 130 may perform a QR code encoding algorithm to encode the signature data and the aforementioned hardware identification code into a two dimensional barcode, and utilizes the resulting two dimensional barcode to be the verification graph G2'.

In this embodiment, before performing the operation 325 (such as before the operation 224), the signature verification server 130 further examines whether the second half of the destination network address utilizing for transmitting the signature data from the hand-held device 120 to the signature verification server 130 belongs to the valid network segment pre-stored in the signature verification server 130. If the second half of the aforementioned destination network address belongs to the valid network segment pre-stored in the signature verification server 130, the signature verification server 130 performs the operation 325. Otherwise, the signature verification server determines that the second half of the destination network address is fake. In this situation, the signature verification server 130 may return a related notification message to the hand-held device 120.

As can be appreciated from the foregoing descriptions, if the signature requester device 110 is hacked and a fake destination message is thus encoded into the graph G1, it would result in that the second half of the destination network address utilized for transmitting the graph G2 from signature activator module 127 to the signature verification server 130 contains the fake destination message. Since the aforementioned fake destination message does not belong to the valid network segment prestored in the signature verification server 130, the signature verification server 130 does not perform the operation 325. Accordingly, the transmission security of the signature data generated by the hand-held device 120 can be effectively ensured by adopting the method of transmitting electronic signature illustrated in FIG. 3.

Figure 4:
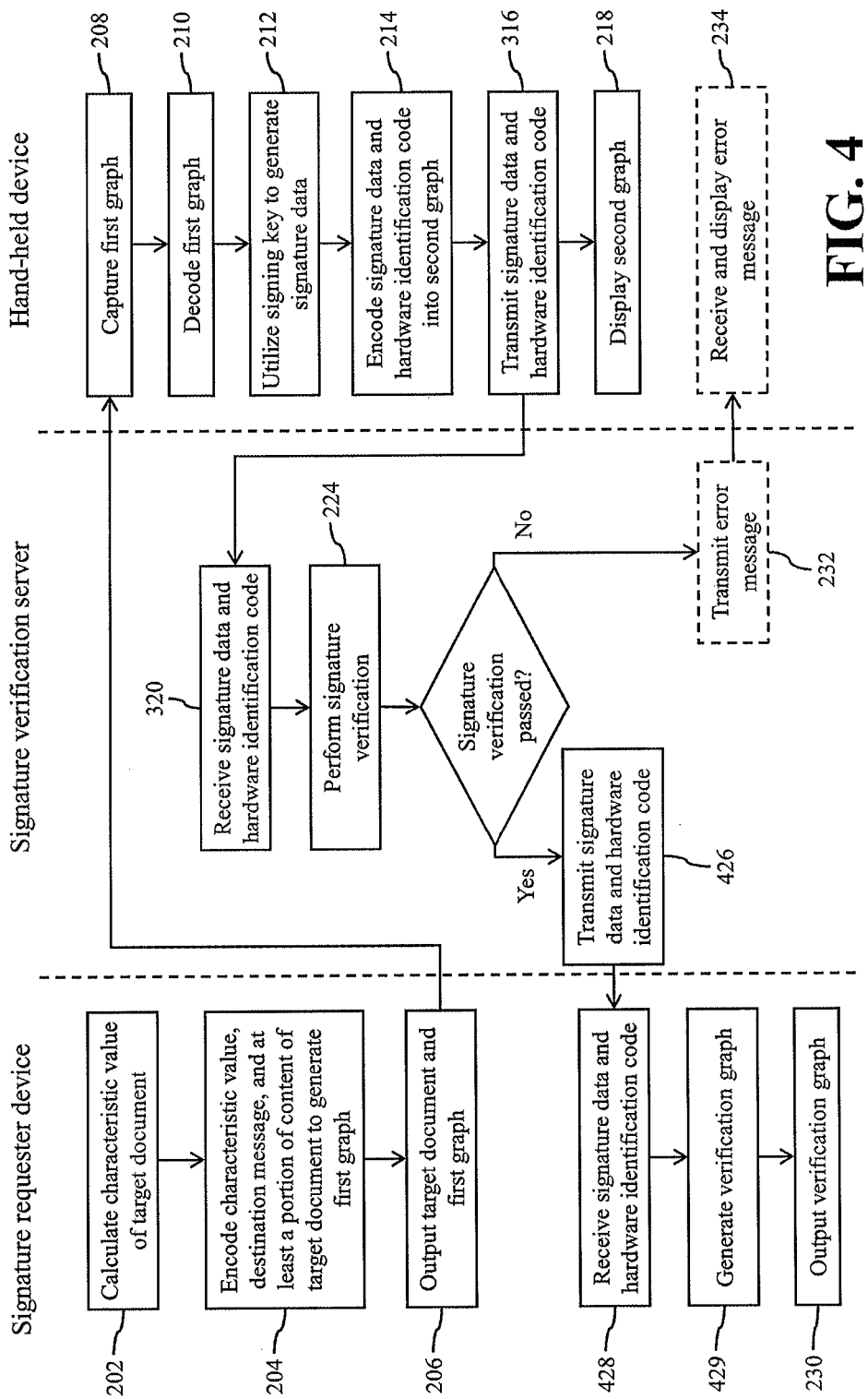

FIG. 4 shows a simplified flowchart of an electronic signature method utilizing an image code according to a third embodiment of the present disclosure. The method of FIG. 4 is similar to the method of FIG. 3. The differences between FIG. 4 and FIG. 3 are the operations 325 and 226 of FIG. 3 are replaced by an operation 426 in FIG. 4, and the operation 228 of FIG. 3 is replaced by operations 428 and 429 in FIG. 4. The aforementioned description regarding other operations in FIG. 2 and FIG. 3 is also applicable to the embodiment of FIG. 4. For simplicity, the following description only illustrates the differences between FIG. 4 and FIG. 3.

According to the method of FIG. 4, if the signature data transmitted from the hand-held device 120 passes a signature verification procedure of the signature verification server 130 successfully, the signature verification server 130 proceeds to the operation 426. Otherwise, the signature verification server 130 proceeds to the operation 232.

In the operation 426, the signature verification server 130 transmits the signature data and the hardware identification code transmitted from the hand-held device 120 to the signature requester device 110 through Internet. In implementation, the signature verification server 130 may obtain information related to the network address of the signature requester device 110 according to a portion of the content of the destination network address utilized for transmitting the signature data and the hardware identification code from the hand-held device 120 to the signature verification server 130. For example, assuming that the destination network address utilized for transmitting the signature data and the hardware identification code from the hand-held device 120 to the signature verification server 130 is "https://www.jrsys.com/auth/XYZ-bank.com/teller#=02." Since the first half of the aforementioned network address "https://www.jrsys.com/auth/" is the predetermined string related to the network address of the signature verification server 130, the signature verification server 130 determines that the second half of the aforementioned network address "XYZ-bank.com/teller#=02" is related to the network address of the signature requester device 110. In this embodiment, the signature verification server 130 transmits the signature data and the hardware identification code to the network address "http://www.XYZ-bank.com/teller#=02" through Internet.

In implementation, before performing the operation 426 (such as before the operation 224), the signature verification server 130 may further examine whether the second half of the destination network address utilized for transmitting the signature data from the hand-held device 120 to the signature verification server 130 belongs to a valid network segment pre-stored in the signature verification server 130. If the second half of the aforementioned destination network address belongs to the valid network segment pre-stored in the signature verification server 130, the signature verification performs the operation 426. Otherwise, the signature verification server 130 determines that the second half of the destination network address is fake. In this situation, the signature verification server 130 may return related notification message to the hand-held device 120.

As can be appreciated from the foregoing descriptions, if the signature requester device 110 is hacked and a fake destination message is thus encoded into the graph C1, it would result in that the second half of the destination network address utilized for transmitting the graph G2 from signature activator module 127 to the signature verification server 130 contains the fake destination message. Since the aforementioned fake destination message does not belong to the valid network segment prestored in the signature verification server 130, the signature verification server 130 does not perform the operation 325. Accordingly, the transmission security of the signature data generated by the hand-held device 120 can be effectively ensured by adopting the method of transmitting electronic signature illustrated in FIG. 4.

Then, the signature requesting module 115 of the signature requester device 110 performs the operation 428 to receive the signature data and the hardware identification code transmitted from the signature verification server 130 through the receiver device 114.

In the operation 429, the signature requesting module 115 utilizes a predetermined image encoding algorithm to encode the signature data and the hardware identification code transmitted from the signature verification server 130 to generate the verification graph G2' which is the same as the graph G2. For example, the signature requesting module 115 may utilize a QR code encoding algorithm to encode the signature data and the aforementioned hardware identification code into a two dimensional barcode, and utilizes the resulting barcode to be the verification graph G2'.

Please note that the executing order of the operations in each of the aforementioned flowcharts is merely an example rather than a restriction to the practical implementations. For example, the operations 216 and 218 of FIG. 2 may be performed simultaneously. The operations 214 316 of FIG. 3 and FIG. 4 may be swapped or performed simultaneously. Additionally, the operations 232 234 in the previous flowcharts may be omitted.

In the foregoing description, the data transmission channel between the handheld device 120 and the signature verification server 130 and the data transmission channel between the signature requester device 110 and the signature verification server 130 are both Internet. But this is merely an example rather than a restriction to the practical implementation. For example, when the dual-channel electronic signature system 100 is employed in official document approval applications, such as any kinds of government institutions, business organizations, or any non-profits organization, the signature verification server 130 may be maintained and operated by the MIS department of the organization. In this situation, the data transmission channel between the hand-held device 120 and the signature verification server 130 and/or the data transmission channel between the signature requester device 110 and the signature verification server 130 may be the intranet of the organization.

In the aforementioned embodiments, the verification graph G2' is the same as the graph G2. In implementation, the verification graph G2' is merely required to be corresponding to the graph G2 and not restricted to be completely identical to the graph G2. For example, in the aforementioned operation 226, the signature verification server 130 may transmit one or more portions of the graph G2, such as a left-half portion, a right-half portion, a upper-half portion, a lower-half portion, a quarter in a lower left corner, a quarter in a upper left corner, a quarter in a lower right corner, a quarter in a upper right corner, or a quarter of a upper-left corner and a quarter of a lower-right corner, as the verification graph G2'. For another example, in the aforementioned operation 325, the signature verification server 130 may utilize a predetermined image encoding algorithm to encode the signature data and the hardware identification code transmitted from the hand-held device 120 into a graph G2, and then transmit one or more portions of the graph G2 as the verification graph G2'. Similarly, in the aforementioned operation 429, the signature requesting module 115 may utilize a predetermined image encoding algorithm to encode the signature data and the hardware identification code transmitted from the signature verification server 130 into the graph G2, and then transmit one or more portions of the graph G2 as the verification graph G2'.

Additionally, in some applications, the signature activator module 127 of the hand-held device 120 may decide a destination network address simply according to the destination message contained in the graph G1 in the above operations 216 and 316, without combining the destination message with other string. For example, when the dual-channel electronic signature system 100 is employed in the official document approval applications, such as any kinds of government institutions, business organizations, or any non-profits organization, the destination message comprised in the graph G1 may address directly to the signature verification server 130 maintained and operated by the MIS department of the organization. In this situation, the signature activator module 127 may simply utilize the destination message comprised in the graph G1 as the destination network address in the aforementioned operations 216 and 316.

Figure 5:
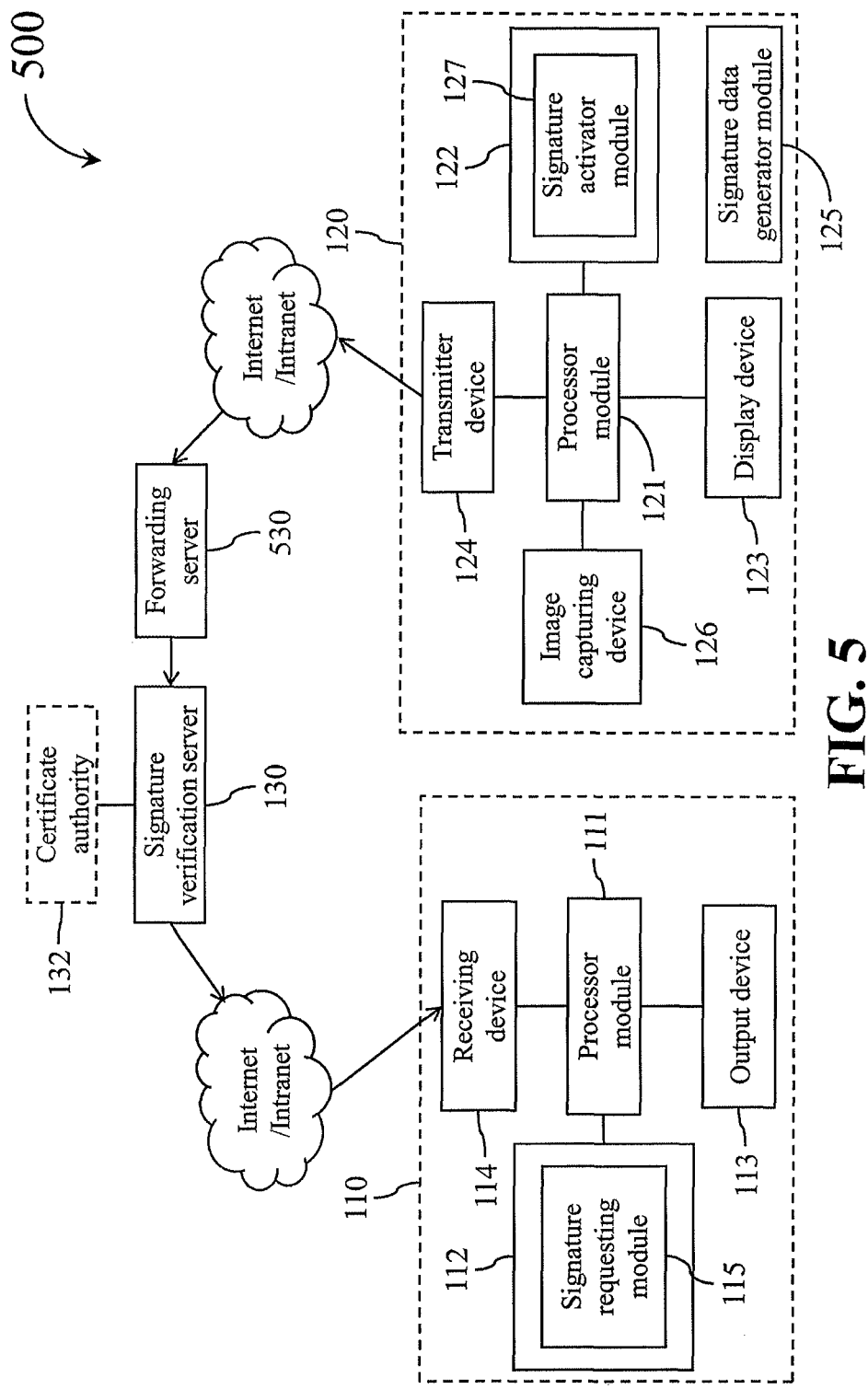
FIG. 5 shows a simplified functional block diagram of a dual-channel electronic signature system according to another embodiment of the present disclosure.

In aforementioned embodiments, the network address decided by the signature activator module 127 in the operation 216 or 316 is addressed to the signature verification server 130. This is merely an example rather than a restriction to the practical implementation. For example, FIG. 5 shows a simplified functional block diagram of a dual-channel electronic signature system 500 according to another embodiment of the present disclosure. The dual-channel electronic signature system 500 of FIG. 5 is similar to the dual-channel electronic signature system 100 of FIG. 1. In compared to the dual-channel electronic signature system 100, the dual-channel electronic signature system 500 further comprises a forwarding server 530. In the dual-channel electronic signature system 500, the network address decided by the signature activator module 127 of the hand-held device 120 in the operation 216 or 316 is addressed to the forwarding server 530, instead of the signature verification server 130. The forwarding server 530 forwards the received graph G2 (or the signature data and the hardware identification code) to the signature verification server 130 maintained and operated by another independent organization. In other words, the forwarding server 530 and the signature verification server 130 may be controlled by two independent organizations, respectively. Additionally, under the structure of the dual-channel electronic signature system 500, the forwarding server 530 is capable of supporting the signature verification operations of a plurality of signature verification servers 130 simultaneously, thereby achieving collaboration between different organizations. Accordingly, the signature verification solution provider is thus enabled to provide more flexible system structure for different organizations.

As described above, by adopting the electronic signature method of FIG. 2, FIG. 3, or FIG. 4, the aforementioned dual-channel electronic signature system 100 or 500 allows the signer to complete the electronic signature operation by simply using the hand-held device 120. The signer does not need to provide other identity certification documents for the signature requester to authenticate. The aforementioned method not only ensures the signature reality and the security of data transmission, but also maintains the convenience of operation for the signature requester and the signer. It is apparently that the aforementioned methods are beneficial to further extend the application of the electronic signature.

Additionally, in the traditional electronic signature system, when the signer utilizes a computer, an IC card, or other equipment to executing the electronic signature on the target document, the signer is unable to know the actual content of the generated signature data and unable to make sure the actual number of times of executing the electronic signature. The whole procedure of traditional electronic signature totally relies on the signer's trust in the electronic signature program and related equipment. However, in the aforementioned dual-channel electronic signature system 100 or 500, the signer is allowed to visually observe and compare the signature-related data (such as the aforementioned graph G2) generated by the hand-held device 120 with the verification data (such as the aforementioned verification graph G2') outputted from the signature requesting module 115. This approach effectively reduces the possibility that the malicious person to fake an electronic signature in the name of the signer, and thus greatly enhances the correctness of identity verification in the business transactions or other administrative procedures.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A dual-channel electronic signature system, comprising:
a signature verification server;
a signature requester device for calculating a characteristic value related to content of a target document, encoding the characteristic value, a destination message and at least a portion of content of the target document to generate a first graph, and outputting the first graph, wherein the destination message is utilized for combining with a predetermined string to form a destination network address pointed to the signature verification server; and
a hand-held device for capturing and decoding an image of the first graph to obtain the characteristic value and the destination message, performing an electronic signature operation on the characteristic value to generate a signature data, encoding the signature data and a hardware identification code to generate a second graph, combining the destination message with the predetermined string to generate the destination network address, and transmitting the second graph to a destination network address, wherein the predetermined string is pre-stored in the hand-held device, related to a network address of the signature verification server, and not allowed to be changed by a user of the hand-held device;

wherein if the signature data contained in the second graph passes a verification procedure of the signature verification server, the signature verification server transmits a verification graph corresponding to the second graph to the signature requester device.

2. A computer program product, stored in a non-transitory computer readable medium, enabling a signature requester device to perform an electronic signature operation, the electronic signature operation comprising:

calculating a characteristic value related to content of a target document;

encoding the characteristic value, a destination message and at least a portion of content of the target document to generate a first graph; and outputting the first graph using an output device of the signature requester device;

wherein the destination message is utilized for combining with a predetermined string to form a destination network address pointed to a signature verification server.

3. A computer program product, stored in a non-transitory computer readable medium, enabling a hand-held device to perform an electronic signature operation, the electronic signature operation comprising:

capturing an image of a first graph using an image capturing device of the hand-held device;

decoding the first graph to obtain a characteristic value and a destination message;

performing an electronic signature operation on the characteristic value to generate a signature data;

combining the destination message with a predetermined string to generate a destination network address pointed to a signature verification server; and utilizing a transmitter device of the hand-held device to transmit the signature data or a second graph generated by encoding the signature data and a hardware identification code to a destination network address;

wherein the predetermined string is pre-stored in the hand-held device and related to a network address of the signature verification server.

4. The computer program product of claim 2, wherein the operation of outputting the first graph comprises:

displaying the first graph using a display device of the signature requester device.

5. The computer program product of claim 2, wherein the characteristic value is a digest message of the target document.

6. The computer program product of claim 2, wherein the first graph is a two dimensional barcode.

7. The computer program product of claim 2, wherein the electronic signature operation further comprises:

utilizing a receiving device of the signature requester device to receive a verification graph from the signature verification server; and outputting the verification graph using the output device; wherein the verification graph corresponds to a second graph displayed on a hand-held device participating in an electronic signature operation.

8. The computer program product of claim 2, wherein the electronic signature operation further comprises:

utilizing a receiving device of the signature requester device to receive a signature data from the signature verification server;

encoding the signature data to generate a verification graph; and outputting the verification graph using the output device;

wherein the verification graph corresponds to a second graph displayed on a hand-held device participating in an electronic signature operation.

9. A computer program product, stored in a non-transitory computer readable medium, enabling a hand-held device to perform an electronic signature operation, the electronic signature operation comprising:

capturing an image of a first graph using an image capturing device of the hand-held device;

decoding the first graph to obtain a characteristic value and a destination message;

performing an electronic signature operation on the characteristic value to generate a signature data;

combining the destination message with a predetermined string to generate a destination network address pointed to a signature verification server; and utilizing a transmitter device of the hand-held device to transmit the signature data or a second graph generated by encoding the signature data to a destination network address;

wherein the predetermined string is pre-stored in the hand-held device and related to a network address of the signature verification server.

10. The computer program product of claim 9, wherein the operation of decoding the first graph comprises:

decoding the image of the first graph to obtain the characteristic value, a destination message, and at least a portion of content of the target document.

11. The computer program product of claim 10, wherein the predetermined string is stored in a signature data generator module within the hand-held device, and is not allowed to be changed by a user of the hand-held device.

12. The computer program product of claim 9, wherein the operation of generating the signature data comprises:

utilizing a signature data generator module within the hand-held device to perform the electronic signature operation on the characteristic value to generate the signature data.

13. The computer program product of claim 9, wherein the first graph is a two dimensional barcode.

14. The computer program product of claim 9, wherein the operation of generating the second graph comprises:

encoding the signature data and a hardware identification code to generate the second graph.

15. The computer program product of claim 9, wherein the operation of transmitting the signature data to the destination network address comprises:

utilizing the transmitter device to transmit the signature data and a hardware identification code to the destination network address.

* * * * *